United States Patent [19]

Berman

[11] 3,989,980
[45] Nov. 2, 1976

[54] VARIABLE INTENSITY WARNING LIGHT
[75] Inventor: Elliot Berman, Quincy, Mass.
[73] Assignee: Exxon Research and Engineering Company, Linden, N.J.
[22] Filed: May 22, 1975
[21] Appl. No.: 580,032

Related U.S. Application Data
[63] Continuation of Ser. No. 449,778, March 11, 1974, abandoned, which is a continuation-in-part of Ser. No. 254,061, May 17, 1972, abandoned.

[52] U.S. Cl. ............................. 315/154; 315/158; 340/81 R
[51] Int. Cl.² ........................................ H05B 37/02
[58] Field of Search ........................... 315/152–154, 315/158, 159; 340/81 R, 114 B, 331; 250/214 D, 212

[56] References Cited
UNITED STATES PATENTS
3,144,561  8/1964  Farrell .................... 250/214 D X
3,366,834  1/1968  Potter ..................... 315/131

Primary Examiner—James B. Mullins
Attorney, Agent, or Firm—Joseph J. Dvorak

[57] ABSTRACT

An automatic variable lighting device is provided with light responsive means, such as a photocell, for controlling the voltage applied to the lamp in response to ambient light conditions so that a nearly constant contrast between lamp intensity and ambient light intensity results.

7 Claims, 3 Drawing Figures

VARIABLE INTENSITY WARNING LIGHT

CROSS-REFERENCE TO RELATED APPLICATION

This application is a Continuation of prior pending application Ser. No. 449,778, filed on Mar. 11, 1974 and now abandoned, which application is a Continuation-In-Part of U.S. application Ser. No. 254,061, filed May 17, 1972, now abandoned.

BACKGROUND OF THE INVENTION

The present invention is concerned with an automatic control system for regulating lamp brilliance, especially in flasher signals. The system will regulate the brilliance of the light emitted from a variable intensity lamp in reference to ambient light conditions so that the visual effect of the signal is always at a constant optimum level, but the power requirements are reduced during nighttime conditions. The control system is well adapted to flasher signals.

Flasher warning signals comprising a lamp whose circuit is intermittently switched on and off by means of a controlled flasher unit are well known. These devices have become widely used for many purposes. Most typically they are thought of as various signals to be used at night to warn motorists and pedestrians of hazards or obstacles present on highways. Because they are used at night, high intensity light is not necessary to assure the requisite visibility. Moreover, during the day, battery output is conserved by turning the devices off. Indeed, flasher warning signal devices are known which are provided with photocells for turning off the flasher device during the daylight hours. Such daytime off flasher signals are exemplified in U.S. Pat. No. 2,901,669 and U.S. Pat. No. 3,139,556.

Use of flasher signals is not restricted to nighttime hours, however. Flasher signals often are required for daytime use, especially on lighted buoys, or in conjunction with traffic signals and isolated highway signs and the like. It is often desirable, and even sometimes necessary, to operate flasher signals during the daylight hours, such as when they are used in conjunction with highway or building constructions, repair and excavation.

In employing flasher warning signals, or distress signals, during daylight hours, a high intensity flasher is used to assure adequate visability of the signal. Conventional high intensity flashers operate 24 hours a day and put out substantially more light than is necessary for good visability in the evening or nightime hours. Since the power supply to these devices is always limited, the extra power supplied during the dark hours results in higher costs by virtue of the need to expend many man hours of labor in maintaining or replacing the power pack used in such flashers, let alone the cost of the power pack itself.

SUMMARY OF THE INVENTION

According to the present invention, a device for emitting illumination of a variable intensity is controlled automatically in reference to ambient lighting conditions by light responsive means which will increase the power supplied to the lamp whereby the constant between the lamp intensity and ambient light intensity is nearly constant, thereby reducing total lamp power requirements during dark hours.

In one embodiment of the present invention, a photovoltaic cell is used as the light responsive means so as to control the voltage supplied to a lamp. Preferably the lamp is a gas discharge flash tube. The voltage applied to the lamp is directly proportional to ambient lighting conditions, thereby varying the intensity of the light emitted in proportion to ambient lighting conditions. Thus, when the day is brighter more power is made available to the lamp in order that it can be adequately seen.

In another embodiment of the present invention, a photocell detector is used to control the amount of power that is supplied from a power source to a lamp.

In yet another embodiment of the present invention, a photocell detector is used in a flasher signal device so that when the light strikes the photovoltaic cell the voltage produced controls the supply of power to a high intensity lamp; and, during dark hours, when substantially no light is striking the photovoltaic cell, the power requirements of a lower intensity lamp or filament are supplied by the power source which typically is a storage battery. Thus, the energy of the power source is conserved during the nighttime hours while the visual effect of the flashing signal is substantially constant. Alternatively a photocell detector is used in this dual lamp or filament embodiment of the present invention.

DETAILED DESCRIPTION

Figure 1:
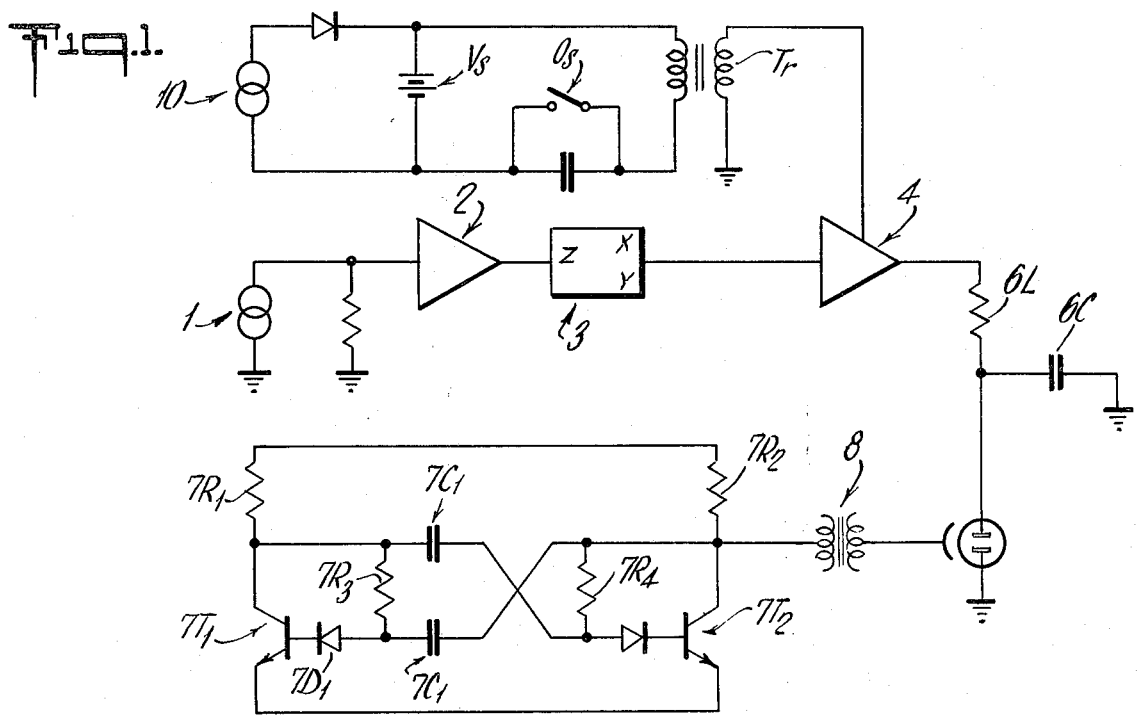
FIG. 1 is a schematic diagram of a variable intensity flasher in which a photovoltaic cell controls the power supplied to a variable intensity lamp in accordance with the present invention.

Referring to FIG. 1, a device for providing intermittent signals of variable intensity has a power supply indicated generally as $V_s$ sufficient to produce a low intensity flash in flash tube 9. Flash tube 9 for example can be a typical gas discharge flash tube, such as a xenon flash tube. The device includes a photovoltaic cell 1 which is responsive to ambient light conditions and which provides a power output which is proportional to the ambient light conditions. Any photovoltaic cell may be employed, such as the self-generating selenium battery and the silicon solar cell. Preferably, the photovoltaic cell is a silicon solar cell. A pulse generator is provided as well as a trigger transformer 8. As can be seen the pulse generator consists of resistors $7R_1$, $7R_2$, $7R_3$ and $7R_4$; transistors $7T_1$ and $7T_2$; diodes $7D_1$ and $7D_2$; capacitors $7C_1$ and $7C_2$, the negative terminals of which are operatively connected to the negative terminal of the power source $V_s$ and the positive terminals of which are operatively connected to the positive terminal of the power source $V_s$. The pulse generator and the trigger transformer are items readily available commercially. The device also includes power regulating means 4 whereby the power from the power supply $V_s$ and from the photovoltaic cell are used to flash tube 9. Thus, during daylight hours when maximum brilliance is required so that the flasher can be visibly detected, light falling on photovoltaic cell 1 produces a current which is converted by current converter 2 to a voltage. This voltage, of course is proportional to the light intensity. Voltage multiplier such as AD 530 multiplier sold by Analog Devices of Mass., in effect, takes the square root of the voltage. The signal resulting from the voltage multiplier 3 is amplified by power regulator 4. Power regulator 4, which preferably is a commercially available integrated circuit including operational amplifiers, and power transistors is a high voltage power regulator, which draws high voltage power from the transformer action of a DC-DC converter.

As shown in FIG. 1 a typical DC-DC converter circuit includes an oscillator $O_s$ and transformer TR. DC-DC converters are commercially available items also.

Continuing with the operation of the flasher signal, also loss charging capacitor circuit is provided which consists of inductor 6L and a capacitor 6C. A typical inductor that is used is a 4 henry choke with 100 ohms maximum d.c. resistance, rated for at least 200 milliamps. A typical capacitor is 2 $\mu$F, 600 working volt d.c. capacitor. Use of an inductor is extremely important since it provides for a great increase in the efficiency of charging capacitor 6C. While it is preferred that a low loss charging circuit be employed for charging capacitor 6C, a typical capacitor charging circuit can be employed, although it would be somewhat less efficient.

In any event, the power output from the power regulator 4 is used to charge capacitor 6C. The power which, in turn, is proportional to the ambient light output from the power regulator 4, as indicated above, is a direct function of the current produced by the photovoltaic cell 1.

Flash tube 9 is triggered by pulses from the pulse generator being applied to trigger transformer 8. Once triggered, all the energy on 6C is rapidly drained by flash tube 9 resulting in a burst of light, the brightness of which is thereby proportional to the ambient light intensity.

An optional, but nonetheless desirable feature of the flasher signal device shown in FIG. 1, is means for direct charging of power source $V_s$. As shown a photovoltaic cell 10, and preferably a plurality of photovoltaic cells (not shown) are operatively connected to power source $V_s$. A plurality of photovoltaic cells are generally referred to as a solar cell array. A very useful solar cell array is commercially available from Solar Power Corporation of Massachusetts. In any event, the power source is refurnished during daylight hours by the output from the photovoltaic cell or cells.

Figure 2:
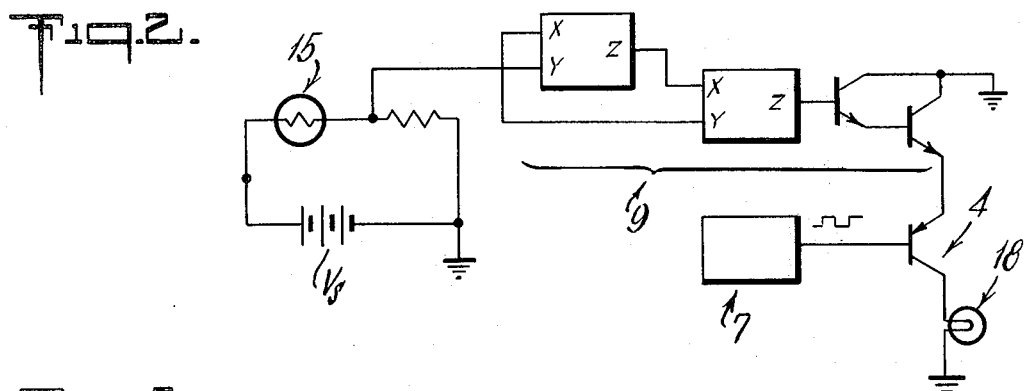
FIG. 2 is a schematic diagram of a flasher device according to the present invention in which a single lamp is powered in direct proportion to ambient light.

Referring now to FIG. 2 an alternate embodiment of the instant invention is described wherein a single lamp 18 is powered in direct proportion to the amount of ambient light that strikes the photocell 15. In practice this is achieved by impressing a voltage, which voltage is proportional to the ambient light detected by 15, on voltage multiplier 9. Voltage multiplier 9 is one which will cube the voltage impressed upon it, since the brightness of an incandescent bulb is roughly proportional to the cube of the voltage applied to it. Voltage multipliers are items of commerce.

Pulses put out from the pulse generator 7 control the application of the cubed voltage to the lamp via gate switch 4. Preferably gate switch 4 is a switch transistor generally available in the trade.

Pulse generator 7 preferably is the same pulse generator discussed in connection with the embodiment of FIG. 1.

Returning to the operative effect, during nighttime hours the voltage from voltage source such as a battery (shown as $V_s$) is applied to the voltage multiplier 9 and thereby impressed on the gate switch 4 to provide a signal that is pulsed by circuit 7, thus causing the lamp to flash. During daylight hours, the voltage of the voltage source which is applied to the lamp is increased by virtue of the decrease in the resistance of the photocell 15. In any event, the output, or brilliance of lamp 18, is directly proportional to the ambient light falling on the photocell 15.

Figure 3:
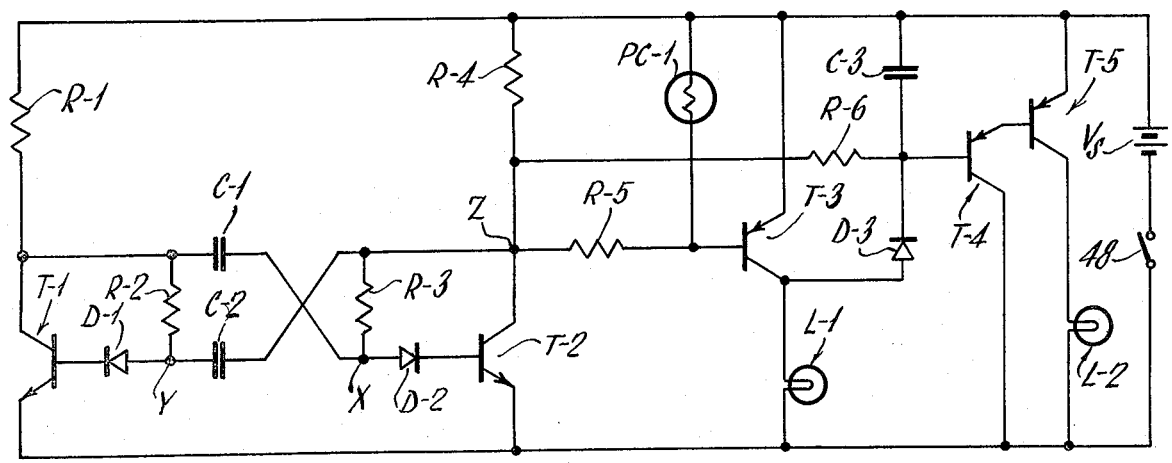
FIG. 3 is a schemmatic diagram of an embodiment of the present invention in which a photocell detector is used to switch the power from one lamp to another in accordance with the present invention.

In another embodiment of the present invention, the intermittent signals of variable intensity are produced by flashing a high intensity light under bright light conditions, and a low intensity light under dark light conditions. As can be seen in FIG. 3, for example, a high intensity lamp L-2 and a low intensity lamp L-1 are provided in combination with a conventional pulse generator such as an oscillator or an astable multivibrator. In FIG. 3 the pulse generator is an astable multivibrator formed by transistors T-1 and T-2, associated resistors R-1, R-2, R-3 and R-4, diodes D-1 and D-2 and capacitors C-1 and C-2. While an astable multivibrator circuit is supplied in providing the necessary pulse wave form for operating the flasher, as already indicated, an oscillator circuit or other means may be employed.

Returning to the schematic diagram of FIG. 3, a photocell detector PC-1 is provided, the operation of which will be described in detail below. The power source of, for example, 12 volts is designated at $V_s$. The high intensity lamp is designated at L-2 and the low intensity lamp at L-1. Transistors T-3, T-4 and T-5, resistor R-5, diode D-3 and capacitor C-3 complete the circuit, along with manual switch 38.

The manual switch 38 is provided as a means of turning the flasher device on and off as may be desired or when necessary. Such a switch is not essential, but it is generally provided as a very attractive convenience.

Although they are not to be considered as limiting in any way, following are listed suitable values which may be used for the various components in the circuits shown in the figures:

| Component | Resistance, Ω |
|---|---|
| Resistor R-1 | 100K |
| Resistor R-2 | 6.8M |
| Resistor R-3 | 2.2M |
| Resistor R-4 | 12K |
| Resistor R-5 | 4.7K |
| | Capacitance, μF |
| Condenser C-1 | 5 |
| Condenser C-2 | 0.01 |
| Condenser C-3 | 1 |

Among the suitable semi-conductor devices which may be used as transistors are NPN and PNP transistors such as 2N3391A, 2N3906, 2N4919. In some cases, of course, it may be necessary to change the values of the resistors in accordance with the known characteristics of the transistors to provide proper biasing and timing.

Among the photocell detectors are photoconductive cells of the cadmium sulfide and cadmium selenide types such as cells sold under the trademark Clairex CL-2 or CL-3 by Clairex Electronics, Mt. Vernon, N.Y., and Clairex CL-704L, sold by the same company, which is of the cadmium selenide type. It is well known in the art that the resistance of these photoconductive cells decreases in proportion to the amount of light impressed upon the cell. Additionally photovoltaic cells such as silicon solar cells may be employed as the photoresponsive means.

Turning now to FIG. 3, the operation of this embodiment of the invention will be described.

Assuming T-2 is initially off and T-1 is on, C-1 will be charged through R-3 and R-4. The voltage for charging C-1 is supplied from the 12 volt battery V, when the voltage at point X reaches 1.2 volts, it forward biases both D-2 and base emitter junction of T-2. T-2 then turns on very rapidly. Point Y is then forced to about a negative 11 volts turning off T-1. It is forced to this level because prior to switching, there were eleven volts across C-2, and since charge cannot be instantly taken from the capacitor, the same voltage must reside across the capacitor after the voltage transition at point Z. C-2 is then charged through R-2 till T-1 is turned back on by the forward biasing of its base emitter junction and the effect is a pulse form put out at point Z.

When there is little ambient light, the resistance of PC-1 is high, thereby allowing T-3 to be turned on through R-5 when T-2 is on, thus illuminating the low intensity bulb L-1. At the same time D-3 is forward biased, preventing T-4 and T-5 from being turned on.

When light falls on PC-1, the drop in its resistance decreases, thereby preventing the base emitter voltage of T-3 from getting high enough to turn T-3 on. Since D-3 is then reverse biased, T-4 and T-5 are turned on through R-6, thereby illuminating the high intensity bulb. Thus, the photocell PC-1 is used to control the brilliance of lamps 1 and 2.

While the operation of the variable intensity flasher has been described with particular reference to a circuit employing two lamps in such circuits, it would be readily appreciated by one skilled in the art that a dual filament, single lamp could be employed.

What is claimed is:

1. A light system in which an operating voltage from a voltage source is applied to a lamp whereby the lamp is lighted, such system comprising:
    a voltage source;
    a lamp;
    power regulating means operably connecting said voltage source and said lamp whereby the power from the voltage source is applied to said lamp whereby the lamp is lighted; and
    photovoltaic means for generating power proportional to ambient light intensity, said photovoltaic means operably connected to said power regulating means whereby the power generated by the photovoltaic means is applied to said lamp so that the brilliance of the lamp is proportionally increased when the ambient light increases and will proportionally decrease when the ambient light decreases thereby maintaining a nearly constant contrast between the brilliance of the lamp light and the ambient light.

2. The device of claim 1 including a pulse generator operably connected to said voltage source whereby the light emitted by the lamp is intermittent.

3. The device of claim 2 whereby the lamp is a gas discharge flash tube.

4. The device of claim 3 including a low charging circuit having a capacitor and an inductor operably connecting said lamp and said power regulating means whereby the efficiency in charging the capacitor is improved.

5. The device of claim 1 wherein the photovoltaic means include a photovoltaic cell for producing a current in response to ambient light conditions; a current converter means for converting the current produced by the photovoltaic cell to a voltage operably connected to said cell; and means for multiplying the voltage so provided by the current converter means connecting said current converter means and said power regulator means whereby the voltage from the voltage source and the photovoltaic cell is applied to said lamp in a manner so that the brilliance of the lamp will proportionally increase when the ambient light increases and will proportionally decrease when ambient light decreases.

6. An automatic flasher signal device in which a voltage from a voltage source is intermittently applied to a lamp by means of a pulse generator, said device comprising:
    variable intensity lamp means;
    a voltage source and a pulse generator operably connected for producing an intermittent electric signal;
    voltage multiplier means for cubing the voltage impressed upon said voltage multiplier means operably connecting said voltage source and the variable intensity lamp means; and
    a photoconductive cell responsive to ambient light conditions and operable to control the electric signal impressed upon the voltage multiplier means by the voltage source whereby the lamp means will flash at one intensity when ambient light conditions decrease to a predetermined level and will flash the lamp means at another intensity when ambient light conditions exceed a predetermined level.

7. An automatic flasher signal device comprising:
    a high intensity lamp and a low intensity lamp;
    a voltage source;
    a pulse generator operably connected to said voltage source to thereby provide an intermittent electric signal;
    switching transistor means operably connecting said voltage source to said high intensity lamp and said low intensity lamp whereby said intermittent electric signal was applied to only one of said lamps; and
    a photoconductive cell operably connected to said switching transitor means for operably controlling the flow of current from the voltage source in such a manner that the intermittent electric signal is impressed upon said high intensity lamp when ambient light conditions decrease to a predetermined level and said electric signal is impressed upon said low intensity lamp when ambient light conditions exceed a predetermined level.

* * * * *